United States Patent [19]

Fox et al.

[11] Patent Number: 4,868,834
[45] Date of Patent: Sep. 19, 1989

[54] SYSTEM FOR RAPIDLY TUNING A LOW PRESSURE PULSED LASER

[75] Inventors: Jay A. Fox, Alexandria; Jeffrey L. Ahl, Annandale, both of Va.

[73] Assignee: The United States of America as represented by the Secretary of the Army, Washington, D.C.

[21] Appl. No.: 243,752

[22] Filed: Sep. 14, 1988

[51] Int. Cl.$^4$ ............................................. H01S 3/10
[52] U.S. Cl. ..................... 372/20; 372/102; 372/98
[58] Field of Search ............................ 372/20, 102, 98

[56] References Cited

U.S. PATENT DOCUMENTS 4,601,036 7/1986 Faxvog et al. ...................... 372/20
4,696,012 9/1987 Harshaw ............................... 372/99

Primary Examiner—Léon Scott, Jr.
Attorney, Agent, or Firm—Milton W. Lee; Max L. Harwell; Anthony T. Lane

[57] ABSTRACT

A rapidly tunable low pressure laser comprised of a one electrode pair low pressure $CO_2$ gas laser gain cell and intra-cavity quarterwave plate and Q-switch. The cell has a fixed laser output coupled at one end of the laser cavity and at the other end of the cavity a wavelength switching device which changes laser lines in less than $1 \times 10^{-3}$ μsec, i.e. changes the wavelengths in less than 1 millisecond within the low pressure laser, to produce at least two quick pulses of different wavelengths at a separation of 1 millisecond. The wavelength switching device is comprised of a fast rotating mirror on the laser optical axis and a fixed grating, or a rotating grating on the optical axis.

5 Claims, 2 Drawing Sheets

SYSTEM FOR RAPIDLY TUNING A LOW PRESSURE PULSED LASER

The invention described herein may be manufactured, used, and licensed by the U.S. Government for governmental purposes without the payment of any royalties thereon.

BACKGROUND OF INVENTION

The present invention relates to a means of rapidly tuning a single low pressure transversely excited pulsed gas laser so that the laser emits pulses of different wavelengths in times so short therebetween that meteorological conditions monitored by each pulse on its way to and from a target are the same since the atmosphere is essentially frozen. The time window for the pulse should be no more than 1 millisecond to 'freeze' the atmosphere. Previously, two or more lasers have been used. Each laser was tuned to a different wavelength and each beam was triggered separately through beam combining optics. This type arrangement had the disadvantages of being complex, heavy, and expensive.

SUMMARY OF THE INVENTION

The present invention makes it possible to use a single laser to emit at least two short pulses of different wavelengths with temporal separation of 1 millisecond or less. The use of separate housings and optics associated with using multiple lasers will be eliminated as the invention provides collinear paths for each of the emitted wavelengths and does not need beam combining optics. Only one electrode pair is required for operation, thus reducing the complexity of the device.

The invention combines a single low pressure gas discharge laser with a rotating grating, or a rotating mirror and fixed grating, wherein the use of a Q-switch and the extended gain of a low pressure discharge makes it possible while operating in the pulsed mode to extract at least two or more laser pulses closely spaced in time from the extended gain low pressure discharge while the alignment angle of the rotating grating with the output coupler changes the wavelengths for each pulse. The low pressure laser may also operated in the continuous wave (CW) mode where the Q-switch stays on all the time and a laser pulse is produced at a different wavelength each time the grating is aligned in the laser optical axis with the output coupler.

It was found that using a single laser results in better multiple signal average performance than using the two laser system with combining optics.

The present low pressure laser system is proposed for use in remote detecting of clouds and pollutants in the oudoor atmosphere but may be used to identify aerosols under other circumstances.

DETAILED DESCRIPTION OF THE PREFERRED EMBODIMENTS

Figures 1, 2:
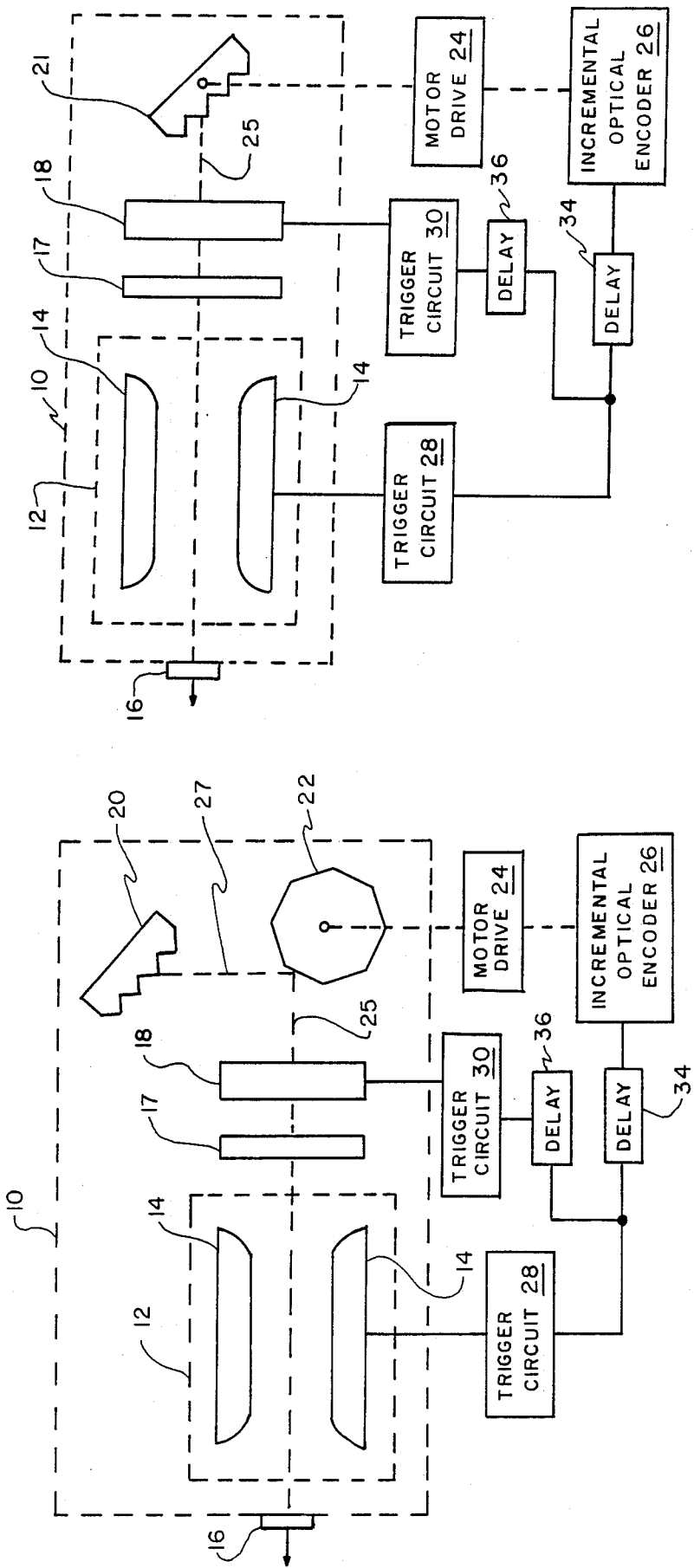
FIG. 1 is a schematic of a pulsed laser of the present invention illustrating one tuning mechanism.
FIG. 2 is a schematic of a pulsed laser of the present invention illustrating another tuning mechanism.

Referring first to FIG. 1, a multiple wavelength laser system such as a $CO_2$ gas laser, is schematically illustrated. Enclosed in a laser cavity 10 is a low pressure discharge region 12, a quarterwave plate 17, and a Q-switch 18 all in optical alignment along optical axis 25. Elements 12, 17, and 18 are positioned in optical alignment between a fixed laser output coupler 16 at one end of cavity 10 and a tuning mechanism, comprised of a solid multifaceted rotatable mirror 22 and a fixed grating 20, at the other end. Axis 25 is extended as optical path 27 between 22 and 20 so that the grating is imaged onto region 12 by reflecting faces 22a of mirror 22. The mirror 22 is depicted as an octagonal solid having equally spaced faces 22a, but 22 may have more or less than eight of these equally spaced faces. The number of reflecting faces 22a is directly dependent on the rotational speed of 22 and to the required speed of switching.

Mirror 22 has a center axis which is hard connected to a synchronous motor drive 24. Also hard connected to motor 24 is an incremental optical encoder 26 such that encoder 26 is sychronized with mirror 22 and has an internal record means that indicates the exact position of each of the mirror faces 22a during each rotation of mirror 22. The encoder 26 may be comprised of a circular disk having say 2400 equally spaced slots and a reset slot through which light from a light emitting diode on one side of the disk projects light therethrough onto detectors which in turn outputs trigger pulses from encoder 26 as needed. When the laser is operating in the pulsed mode versus the continuous wave (CW) mode these trigger outputs from 26 are generally delayed by a first time delay circuit 34 prior to triggering a laser trigger circuit 28. Circuit 28 in turn applies voltage to electrode pairs 14 to initiate the low pressure discharge in region 12. The slow gain energy curve build up of the low pressure laser generally lasts about 50 to 500 msec including the tail portion, with high gain over about 300 msec. The Q-switch trigger circuit 30 may be triggered simultaneously with the laser trigger circuit 28 with a second time delay circuit 36 bypassed. However, for optimum energy switching a delay is provided by circuit 36 so that Q-switching starts after the gain curve has started to build up. Prior to the initiation of the Q-switching circuit 30 the quarterwave plate 17 has been rotating polarized light within cavity 10 and produces large cavity losses until the Q-switch 18 is turned on. The trigger pulses from encoder 26 are generated t a time, including delays from circuits 34 and 36, at which one of the faces 22a of mirror 22 will optically align gratings on grating 20 to retroreflect back along the laser optical axis 25. The exact angular position of the gratings with respect to the optical axes 27 and 25 determines the wavelength of the pulsed radiation reflected therefrom the number of grating rulings is chosen as 135 lines per millimeter but is not limited to that number. Different wavelengths are retroreflected from the gratings according to the preselected reflecting angle of radiation off each face 22aThe Q-switch trigger circuit 30 should trigger the Q-switch on and off very rapidly, i.e. from 100 sec to a few nanoseconds, so that the gain curve may be switched or sampled at least two times while adjacent mirror faces 22a have moved through different alignment angles with optical axis 25 so hat two different and distinct wavelnegths are retroreflected from the gratings. The result is that lasing takes place within the laser and two or more energy pulses of preselected wavelengths are emitted from the laser within 1 millisecond of each other while the discharge region 12 retains enough of the initially stored energy to permit lasing within the 1 millisecond time.

FIG. 2 illustrates the same functional system as that explained for FIG. 1. In this embodiment however the rotatable mirror 22 is eliminated and the grating 21 itself is rotated by motor 24. Encoder 26 and grating 21 are synchronized so that the trigger circuits 28 and 30 are activated when the grating lines on 21 are at the preselected angle of incidence with the optical axis 25 to retroreflect the desired wavelength pulse and produce a laser pulse output at that particular wavelength.

It is an object of the present system to provide a laser transmitter system that irradiates the atmosphere with two or more different wavelength pulses to check for the presence of specific pollutants. The atmospheric path which can be checked is typically 1–5 kilometers horizontally. Each different wavelength pulse of a multiple pulse transmission, say a quick double pulse for this explanation, should traverse the intervening atmosphere in less than 1 millisecond to "freeze" the meteorological properties. Most of the atmospheric pollutants have strong absorption features in the 9–11 μm spectrum. THerefore the tunable $CO_2$ gas laser is the preferred laser for use in this system. The same principle of fast switching pulses of different wavelengths may however be used with other type lasers. In monitoring the atmosphere for a specific pollutant, one of othe wavelengths of the double pulse is chosen to be relatively unaffected by absorption and scatter while the other wavelength is chosen to be strongly affected.

We claim:

1. A system for rapidly tuning a low pressure pulsed laser over multiple wavelengths, said system comprising:

a low pressure one electrode pair discharge region in a laser cavity having a laser trigger means connected to said electrode pair for initiating low pressure discharge within said discharge region into a slow gain energy curve lasting about 50 to 500 milliseconds with high gain over about 300 milliseconds;

a quarterwave plate and a Q-switch in optical alignment with said one electrode pair discharge region along the laser optical axis wherein said quarterwave plate is initially rotating polarized light within said cavity and producing large cavity losses until a Q-switch triggering means triggers said Q-switch on and off within 100 μ sec to a few nanoseconds to sample said slow gain energy curve of the low pressure laser at least two time during the high gain portion of said slow gain energy curve for providing at least two high gain Q-switched pulses inside the laser within 1 millisecond of each other;

a fixed laser output coupler at the discharge region end of said laser cavity;

a rotatable grating means for wavelength switching said at least two high gain Q-switched pulses, said rotatable grating means for wavelength switching comprised of an optically rotatably grating tuning mechanism having a plurality of grating lies thereon rotatable in optical alignment with said Q-switch on said laser optical axis and an incremental optical encoder and a sychronous motor hard connected to both said tuning mechanism and said incremental optical encoder, wherein said plurality of grating lines are selectively imaged during increments of rotation at a preselected angle of incidence with said laser optical axis so as to retroreflect said at least two high gain Q-switched pulses as preselected wavelength pulses from said optically rotatable grating tuning mechanism and out said fixed laser output coupler, said rotatable grating means for wavelength switching further comprised of a first time delay circuit which receives and delays a trigger pulse generated within said incremental optical encoder according to the approaching rotational exact angular position of said plurality of grating lines which are synchronized between said tuning mechanism and said incremental optical encoder, a laser trigger circuit and a second delay circuit that receive the delayed trigger circuits from said first delay circuit wherein said laser trigger circuit is activated to apply laser trigger voltage across said electrode pair to initiate laser low pressure discharge into said slow gain energy curve wherein said second delay circuit further delays said trigger pulse from said encoder with the twice delayed pulse activating a Q-switch trigger circuit to Q-switch said slow gain energy curve at least two times before the low pressure discharge energy is expended wherein said rotatable grating mechanism has rotated said plurality of grating lines to change the wavelengths of said at least two retroreflected Q-switched pulses.

2. A system as set forth in claim 1 wherein said optically rotatable grting tuning mechanism is comprised of a rotatable grating tuning mechanism is comprised of a rotatable solid multifaceted mirror in the laser optical path and an offset fixed grating having a plurality of grating lines thereon in optical alignment with said multifaceted mirror wherein said encoder and said rotable solid multifaceted mirror are synchronized so that said Q-switch trigger circuit is activated at least two times during the movement of two adjacent mirror faces of said multifaceted mirror through said laser optical axis when said plurality of grating lines are optically aligned at two different preselected angles of incidence with said laser optical axis to retroreflect said at least two high gain Q-switched pulsed as preselected wavelength pulses.

3. A system as set forth in claim 1 wherein said laser operates in the continuous wave mode in which the Q-switch is on at all times wherein laser pulses are emitted whenever each face of said rotatable mirror aligns said grating lines along the laser optical axis.

4. A system as set forth in claim 1 wherein said optically rotatable grating tuning mechanism is comprised of a rotatable grating having a plurality of grating lines thereon in the laser optical axis wherein said encoder and said rotatble grating are sychronized so that said laser trigger circuit and said Q-switch trigger circuit are activated when said plurality of grating lines are aligned at two different preselected angles of incidence with said laser optical axis to retroreflect said at least two high gain Q-switched pulses as preselected wavelength pulses.

5. A system as set forth in claim 4 wherein said rotatable grating plurality of grating lines is 135 per millimeter.

* * * * *